(12) United States Patent
Theberge et al.

(10) Patent No.: US 11,898,019 B2
(45) Date of Patent: Feb. 13, 2024

(54) METHODS FOR PROCESSING POLYOLEFINS

(71) Applicant: Saudi Arabian Oil Company, Dhahran (SA)

(72) Inventors: Douglas Theberge, Gardner, MA (US); Seth Sharber, Watertown, MA (US)

(73) Assignee: Saudi Arabian Oil Company, Dhahran (SA)

( * ) Notice: Subject to any disclaimer, the term of this patent is extended or adjusted under 35 U.S.C. 154(b) by 4 days.

(21) Appl. No.: 17/583,643

(22) Filed: Jan. 25, 2022

(65) Prior Publication Data
US 2023/0235142 A1    Jul. 27, 2023

(51) Int. Cl.
| | | |
|---|---|---|
| C08J 7/12 | (2006.01) |
| B01J 21/04 | (2006.01) |
| B01J 29/04 | (2006.01) |
| B01J 29/80 | (2006.01) |
| B01J 29/08 | (2006.01) |
| B01J 29/18 | (2006.01) |
| B01J 29/70 | (2006.01) |

(52) U.S. Cl.
CPC .............. *C08J 7/12* (2013.01); *B01J 21/04* (2013.01); *B01J 29/04* (2013.01); *B01J 29/084* (2013.01); *B01J 29/18* (2013.01); *B01J 29/7015* (2013.01); *B01J 29/80* (2013.01); *C08J 2323/06* (2013.01); *C08J 2323/12* (2013.01)

(58) Field of Classification Search
CPC ...... C08J 7/12; C08J 2323/06; C08J 2323/12; B01J 21/04; B01J 29/04; B01J 29/18; B01J 29/7015; B01J 29/80; B01J 29/084
See application file for complete search history.

(56) References Cited

U.S. PATENT DOCUMENTS

| | | |
|---|---|---|
| 7,902,417 B2 | 3/2011 | Goldman et al. |
| 2021/0122898 A1 | 4/2021 | Luthe et al. |

FOREIGN PATENT DOCUMENTS

| | | | | |
|---|---|---|---|---|
| CN | 101426822 A | * | 5/2009 | ............... C07C 2/08 |
| EP | 0432438 A1 | | 6/1991 | |

OTHER PUBLICATIONS

Anderson et al., "Mechanochemistry and organic synthesis: from mystical to practical", Royal Society of Chemistry, Green Chemistry, vol. 20, pp. 1435-1443, Feb. 23, 2018.
Balema et al., "Depolymerization of polystyrene under ambient conditions", New Journal of Chemistry, Manuscript ID NJ-COM-12-2020-005984, 6 pages, Dec. 7, 2020.
Boaen et al., "Post-Polymerization functionalization of polyolefins", Chemical Society Reviews, vol. 34, pp. 267-275, 2005.
Burange et al., "Heterogeneously catalyzed strategies for the deconstruction of high density polyethylene: plastic waste valorisation to fuels", Green Chemistry, vol. 17, No. 1, pp. 146-156, 2015.
Diop et al., "Ester Functionalization of Polypropylene via Controlled Decomposition of Benzoyl Peroxide during Sold-State Shear Pulverization", Macromolecules, vol. 46, pp. 7834-7844, 2013.
Diop et al., "Well-mixed blends of HDPE and ultrahigh molecular weight polyethylene with major improvements in impact strength achieved via solid-state shear pulverization", Polymer, vol. 55, pp. 4948-4958, 2014.
Diop et al., "Novel synthesis of branched polypropylene via solid-state shear pulverization", Polymer, vol. 60, pp. 77-87, 2015.
Do et al., "Mechanochemistry: A Force of Synthesis", ASC Central Science, vol. 3, pp. 13-19, 2017.
Haibach et al., "Alkane Metathesis by Tandem Alkane-Dehydrogenation Olefin-Methathesis Catalysis and Related Chemistry", Accounts of Chemical Research, vol. 45, No. 6, pp. 947-958, 2012.
Hernandez et al., "Metal-catalyzed organic reactions using mechanochemistry", Tetrahedron Letters, vol. 56, pp. 4253-4265, 2015.
Hernandez et al., "Altering Product Selectivity by Mechanochemistry", Journal of Organic Chemistry, vol. 82, pp. 4007-4019, 2017.
Huang et al., "Efficient Heterogeneous Dual Catalyst Systems for Alkane Metathesis", Advanced Synthesis & Catalysis, vol. 352, pp. 125-135, 2010.
Iyer et al., "Comparison of polyolefin biocomposites prepared with waste cardboard, microcrystalline cellulose, and cellulose nanocrystals via solid-state shear pulverization", Polymer, vol. 75, pp. 78-87, 2015.
Jehanno et al., "Organocatalysis for depolymerisation", Royal Society of Chemistry, Polymer Chemistry, vol. 10, pp. 172-186, 2019.
Jia et al., "Efficient and selective degradation of polyethylenes into liquid fuels and waxes under mild conditions", Sci. Adv, vol. 2:e15091591, Jun. 17, 2016.
Martey et al., "Hybrid Chemo-Mechanical Plastics Recycline: Solvent-free, High-speed Reactive Extrusion of Low-Density Polyethylene", ChemSusChem 10.1002/cssc.202100968, Jun. 2021.
Miandad et al., "Catalytic pyrolysis of plastic waste: A review", Process Safety and Environmental Proection, vol. 102, pp. 822-838, 2016.
Munir et al., "Hydrocracking of virgin and waste plastics: A detailed review", Renewable and Sustainable Energy Reviews, vol. 90, pp. 490-515, 2018.

(Continued)

*Primary Examiner* — Rabon A Sergent
(74) *Attorney, Agent, or Firm* — DINSMORE & SHOHL LLP (57) ABSTRACT

A method for processing polyolefins may include contacting solid polyolefins with a solid catalyst to form a reaction mixture. The solid catalyst may be chosen from a zeolite, a microporous aluminosilicate, an alumina, or combinations thereof. The solid polyolefins may be chosen from polyethylene, polypropylene, or combinations thereof. The method may include mechanically agitating the reaction mixture to produce olefin-containing hydrocarbon polymers and separating the olefin-containing hydrocarbon polymers from the solid catalyst. The olefin-containing hydrocarbon polymers include a carbon-carbon double bond in the backbone of the hydrocarbon polymers.

20 Claims, 7 Drawing Sheets

(56) References Cited

OTHER PUBLICATIONS

Plummer et al., "The post-modification of polyolefins with emerging synthetic methods", Royal Society of Chemistry, Polymer Chemistry, vol. 11, pp. 6862-6872, 2020.

Rahimi et al., "Chemical recycling of waste plastics for new materials production", Nature Reviews, Chemistry, vol. 1, Article No. 46, pp. 1-11, 2017.

Schneiderman et al., "50th Anniversary Perspective: There is a Great Future in Sustainable Polymers", ASC Publications, Macromolecules, vol. 50, pp. 3733-3749, 2017.

Sharuddin et al., "A review on pyrolysis of plastic wastes", Energy Conversion and Management, vol. 115, pp. 308-326, 2016.

Tan et al., Mechanochemistry for Organic Chemists: An Update, European Journal of Organic Chemistry, vol. 1, pp. 18-33, 2018.

Giacovelli, "Single-Use Plastics: A Roadmap for Sustainability", UN Environment-IETC: 2018.

Ellen MacArthur Foundation, "The New Plastics Economy, Rethinking the future of plastics", World Economic Forum, Jan. 2016.

Zhao et al., "Catalytic dehydrogenation of propane to propylene over highly active PtSnNa/y—$Al_2O_3$ catalyst", Chinese Chemical Letters, vol. 29, pp. 475-478, 2018.

* cited by examiner

METHODS FOR PROCESSING POLYOLEFINS

TECHNICAL FIELD

Embodiments of the present disclosure generally relate to chemical processing and, more particularly, to methods for processing polyolefins.

BACKGROUND

A growing plastic waste crisis threatens both global living systems and future petrochemical production of plastics. Over 300 million tons of plastic waste are generated annually, about 10% of which is recycled and about 70% of which is disposed of in landfills or leaches into the environment. The unsustainable nature of single-use plastics represents an important target for addressing this problem, as they constitute roughly 35% of total plastics production and half of all plastic waste. Single use plastics general have exceedingly short useful lifetimes relative to their persistence in the environment as waste. Strategies that close the loop on waste—transforming the current cradle-to-grave design paradigm to a circular life cycle where waste materials can be converted into new products of equal or higher value—are key components in solving the imminent waste crisis and advancing business objectives. Closing the loop on plastics with new technologies to valorize waste advances environmental sustainability.

Chemical recycling is one approach to this problem in which chemical processes convert waste to value-added products, including hydrocarbon fuels and petrochemicals, such as platform chemicals and monomers that may be used in new plastic production. This circularity in design, with continuous transformation between useful products, waste, and chemical building blocks, creates a self-restoring cradle-to-cradle life cycle that is theoretically endless, thereby eliminating the concept of waste. Importantly, chemical recycling overcomes the quality losses, downcycling, that limits the efficacy of mechanical recycling. Additionally, chemical recycling may be carried out with greater tolerance for the contaminants and additives found in waste streams. Pyrolysis for conversion of plastic waste to hydrocarbon fuels is one method used in chemical recycling of mixed plastics, in which waste is heated to about 500° C. to 1000° C. in the absence of oxygen to drive thermal cracking of polymer chains to lower molecular weight fractions that may be used for transportation fuels or fed into typical refinery processes for conversions to chemicals. Catalytic pyrolysis has enabled direct production of olefins among a distribution of paraffins at lower temperatures. Despite work from major chemicals producers, the utility of pyrolysis is limited by several fundamental considerations including the energy requirements for plant operation at high temperatures, catalyst coking at elevated temperatures, a relatively large carbon footprint, and need for very large scales to demonstrate economic benefits.

SUMMARY

Accordingly, there is a need for processes that enable mild chemical recycling of plastic waste. For example, processes that occur at low temperatures, in the presence of air, and with a residence time of several hours or less. The presently described methods may address these problems.

As described in the present disclosure, solid polyolefins may be contacted with a solid catalyst and mechanically agitated to produce olefin-containing hydrocarbon polymers. The use of such mechanical recycling process has advantages over conventional chemical recycling processes for recycling polyolefins, such as pyrolysis, because mechanical agitation is used to drive the reaction forward instead of heat. Generally, mechanical agitation, such as milling, requires less energy than heating. Accordingly, the presently described methods may allow for the processing of polyolefins with reduced energy costs. Furthermore, methods described in the present disclosure may take place at milder conditions than conventional polyolefin recycling processes, such as pyrolysis, because the methods described herein occur at temperatures below 100° C. under an atmosphere of air, while pyrolysis generally occurs at high temperatures, such as temperatures from 500° C. to 1000° C., under an inert atmosphere. The use of mechanical methods to functionalize the polyolefin polymers with an olefin moiety may enable further processing of the plastic in a recycling process, as the carbon-carbon double bonds may be more reactive than the carbon-carbon single bonds of the original polyolefin material.

According to one or more embodiments described herein, a method for processing polyolefins may include contacting solid polyolefins with a solid catalyst to form a reaction mixture. The solid catalyst may be chosen from a zeolite, a microporous aluminosilicate, an alumina, or combinations thereof. The solid polyolefins may be chosen from polyethylene, polypropylene, or combinations thereof. The method may include mechanically agitating the reaction mixture to produce olefin-containing hydrocarbon polymers and separating the olefin-containing hydrocarbon polymers from the solid catalyst. The olefin-containing hydrocarbon polymers include a carbon-carbon double bond in the backbone of the hydrocarbon polymers.

BRIEF DESCRIPTION OF THE DRAWINGS

The following detailed description of specific embodiments of the present disclosure can be best understood when read in conjunction with the following drawings, in which.

DETAILED DESCRIPTION

Embodiments described herein relate to methods for processing polyolefins by methods that may include contacting the polyolefins with a catalyst to form a reaction mixture, mechanically agitating the reaction mixture to form olefin-containing hydrocarbon polymers, and separating the olefin-containing hydrocarbon polymers from the catalyst. The methods may result in the formation of olefin-containing hydrocarbon polymers that comprise carbon-carbon double bond in the backbone of the hydrocarbon polymers.

As described herein, "polyolefins" refer to polymers derived from olefins, having a general formula $(CH_2CHR)_n$, where R is a hydrogen or an alkyl and n is the number of monomers in the polymer. Examples of polyolefins include polyethylene and polypropylene. In one or more embodiments, the polyolefins are solid in state. That is, the polyolefins consist essentially of solids, referred to herein as "solid polyolefins." In one or more embodiments, the solid polyolefins may be chosen from polyethylene or polypropylene. In general, the polyethylene and polypropylene that are reacted do not include carbon-carbon double bonds in their backbones in any detectable amount.

In one or more embodiments, the solid polyolefins may be in the form of pellets, chips, granules, or films. The solid polyolfefins may have any size and shape suitable for use in the equipment used to mechanically agitate the polyolefins. In embodiments, the solid polyolefins may be derived from used single-use plastics. In such embodiments, the polyolefins may comprise post-consumer resin. For example, the solid polyolefins may comprise single-use plastic articles that have been shredded in preparation for recycling.

According to embodiments, the catalyst is in a solid state. That is, the catalyst consists essentially of solids, referred to herein as "solid catalyst." The catalyst may be chosen from a zeolite, a microporous aluminosilicate, a silica, or combinations thereof. In one or more embodiments, the catalyst may be in the form of a free-flowing powder. The catalyst may have any size or shape suitable for use in the equipment used to mechanically agitate the polyolefins and catalyst.

As described herein, in some embodiments, the solid catalyst comprises a zeolite. For example, the solid catalyst may comprises a USY zeolite, a HZSM-5 zeolite, a CHA zeolite, or combinations thereof. However, it should be understood that the methods disclosed herein, according to various embodiments, are not necessarily limited by the type of zeolite utilized.

As described herein, in some embodiments, the solid catalyst comprises a microporous aluminosilicate. The microporous aluminiosilicate may have a silica to alumina ratio of less than or equal to 1500. For example, the microporous aluminosilicate may have a silica to alumina ratio from 1 to 1500, from 1 to 1000, from 1 to 500, from 1 to 100, or from 1 to 50. In one or more embodiments, the microporous aluminosilicate may have a silica to alumina ratio from 20 to 30. For example, the microporous aluminosilicate may have a silica to alumina ratio from 20 to 28, from 20 to 26, from 20 to 24, from 20 to 22, from 22 to 30, from 24 to 30, from 26 to 30, from 28 to 30, or any combination or subset of these ranges. The silica to alumina ratio of the microporous aluminosilicate is a molar ratio. The microporous aluminosilicate may comprise a microporous framework comprising a plurality of micropores having diameters of less than or equal to 2 nm. Without intending to be bound by theory, the microporous aluminosilicate may comprise Bronsted acid sites, which may facilitate the reaction of the solid polyolefins.

As described herein, in some embodiments, the solid catalyst comprises alumina. The alumina catalyst may comprise, consist essentially of, or consist of aluminum oxide $(Al_2O_3)$ in either its basic or neutral form. The alumina may be in either an alpha phase or a gamma phase. According to one or more embodiments, the catalyst comprising alumina may be in the form of a free-flowing powder.

According to embodiments described herein, the solid polyolefins are contacted with a solid catalyst to form a reaction mixture. The contacting may include thorough mixing of the solid polyolefins with the sold catalyst. The contacting may be within a mechanical agitation device, or the leadway or storage area associated with a mechanical agitation device.

The reaction mixture, as described herein, refers to the mixture that is mechanically agitated. The reaction mixture may comprise, consist essentially of, or consist of the solid polyolefins and the solid catalyst. For example, the reaction mixture may comprise at least 50 wt. %, at least 60 wt. %, at least 70 wt. %, at least 80 wt. %, at least 90 wt. %, at least 95 wt. %, at least 99 wt. %, at least 99.9 wt. %, or 100 wt. % of the solid polyolefins and the solid catalyst. The reaction mixture may generally be a collection of solids, such that the reaction mixture is substantially free of liquids and consists essentially of solid state materials.

According to embodiments, mechanically agitating the reaction mixture may occur at a temperature less than a melting point of the solid polyolefins. For example, mechanically agitating the reaction mixture may occur at a temperature of less than or equal to 100° C., such as less than or equal to 90° C., less than or equal to 80° C., less than or equal to 70° C., less than or equal to 60° C., less than or equal to 50° C., less than or equal to 40° C., less than or equal to 30° C., or about room temperature. Without intending to be bound by theory, the melting point of various polyethylene compositions may be from about 115° C. to 135° C. By keeping the temperature at which the mechanical agitation of the solid polyolefins and the catalyst occurs below the melting point of the polyolefins, such as polyethylene, the polyolefins may remain in a solid state throughout the reaction process.

In one or more embodiments, mechanically agitating the reaction mixture may occur under an atmosphere comprising air. In other words, embodiments of the methods described herein may not require the mechanical agitation of the reaction mixture to occur in an inert environment.

In one or more embodiments, the ratio of the solid polyolefins to the catalyst in the reaction mixture may be from 1:100 to 15:100. For example, according to embodiments, the ratio of solid polyolefins to the catalyst may be from 1:100 to 3:100, from 3:100 to 5:100, from 5:100 to 7:100, from 7:100 to 9:100, from 9:100 to 11:100, from 11:100 to 13:100, from 13:100 to 15:100, or combinations of these ranges. The ratio of solid polyolefins to catalyst in the reaction mixture is based on the mass of the solid polyolefins and catalyst. Without intending to be bound by theory, the ratio of solid polyolefins to the catalyst in the reaction mixture may affect the yield of olefin-containing hydrocarbons in the product. Including solid polyolefins and catalyst in the reaction mixture in a ratio of 1:100 to 15:100 may maximize the production of olefin-containing hydrocarbon polymers in the product. If the reaction mixture includes more solid polyolefins than catalyst, then the mixing between the catalyst and the solid polyolefins may be unsatisfactory, such that the yield of olefin-containing hydrocarbon polymers in the product is reduced.

As described herein, the reaction mixture may be mechanically agitated to produce olefin-containing hydrocarbons. As described herein, "mechanically agitating" refers to agitation or mixing that is aggressive enough to provide sufficient energy to a system to drive a chemical reaction forward. For example, the agitation may result in adequate pressure between the catalyst and the polyolefin to result in a chemical reaction. For example, mechanical agitation of a reactant mixture may provide sufficient energy to the reactant mixture such that a chemical reaction occurs to produce a product. This methodology for carrying out chemical reactions that includes contacting reactants by mechanical agitation may be referred to as "mechanochemistry." Without intending to be bound by theory, mechanochemistry may be used reproduce conventional air-free and high-temperatures reactions under reduced temperatures and reduced reaction times, in the presence of air. Mechanochemistry may avoid solubility challenges present in other reaction schemes. Such solubility challenges may limits the mild chemical recycling of insoluble polyolefins using other reaction methods. Additionally, mechanochemistry may also enable reactivity to produce products that could not be produced by conventional reaction schemes.

Examples of mechanical agitation suitable for use in one or more embodiments of the presently described methods include milling, grinding, and extruding. Mechanical agitation may be achieved by any suitable mechanical agitation device including, but not limited to, mills, grinders, and extruders. For example, the mechanical agitation device may be a ball mill, a twin screw extruder, a solid state shear pulverizer, a sonic bath, or a mixer mill. In one or more embodiments, the mechanical agitation device may include a cooling mechanism that is operable to keep the temperature of the reactant mixture below a desired temperature during the mechanical agitation. For example, the cooling mechanism may be operable to keep the temperature of the reactant mixture below the melting point of the solid polyolefins or below 100° C. The olefin-containing hydrocarbons may be solid state materials that have the same size or smaller size than that of the solid polyolefins.

According to embodiments, mechanically agitating the reaction mixture may occur for a period of time from 1 hour to 12 hours. For example, according to embodiments, mechanically agitating the reaction mixture may occur for a period of time from 1 hour to 2 hours, from 2 hours to 3 hours, from 3 hours to 4 hours, from 4 hours to 5 hours, from 5 hours to 6 hours, from 6 hours to 7 hours, from 7 hours to 8 hours, from 8 hours to 9 hours, from 9 hours to 10 hours, from 10 hours to 11 hours, from 11 hours to 12, or combinations of these ranges. In one or more embodiments, mechanically agitating the reaction mixture may occur for a period of time greater than 1 minute. Without intending to be bound by theory, the minimum amount of time over which mechanically agitating the reaction mixture may occur may be the amount of time necessary for the mechanical agitation device to reach steady state operation, for example, reaching a target speed.

According to embodiments described herein, mechanically agitating the reaction mixture produces the olefin-containing hydrocarbon polymers, where the olefin-containing hydrocarbon polymers comprise carbon-carbon double bonds in the backbones of the polymers. For example, in an embodiment, the solid polyolefin may be polyethylene, having a chemical structure according to chemical formula (I):

Chemical Formula (I)

In Chemical Formula (I), n represents the number of repeated monomers. Mechanically agitating the polyethylene and catalyst produces an olefin-containing hydrocarbon product. In an exemplary embodiment, the olefin-containing hydrocarbon product may have a chemical structure according to Chemical Formula (II):

Chemical Formula (II)

In Chemical Formula (II), n represents the number of repeated units. As shown in Chemical Formula (II), the olefin-containing hydrocarbon product comprises a carbon-carbon double bond in the backbone of the hydrocarbon polymer chain. Without intending to be bound by theory, the methods for processing polyolefins described herein may be operable to dehydrogenate carbon atoms in the backbone of a polymer such that olefin moieties are including in the backbone of the product polymers, the olefin-containing hydrocarbon product.

According to embodiments, the presence of carbon-carbon double bonds in the backbone of a polymer may be confirmed by various analytical techniques. For example, hydrogen or carbon nuclear magnetic resonance spectroscopy may be used to detect the presence of carbon-carbon double bonds in a polymer backbone. Such analytical techniques are described in further detail and exemplified in the Examples section. Furthermore, the presence of a carbon-carbon double bond in the olefin-containing hydrocarbon product may be confirmed by performing a metathesis reaction on a sample of the olefin-containing hydrocarbon product to tag the carbon-carbon double bond, and analyzing the product of the metathesis reaction to confirm the presence of the tagged carbon-carbon double bond. Such techniques are also described in further detail and exemplified in the Examples section.

Generally, polyolefins, such as polyethylene and polypropylene, do not include carbon-carbon double bonds in the polymer backbone. Without intending to be bound by theory, the presence of highly inert structures, such as unreactive carbon-carbon single bonds and carbon-hydrogen bonds, which have about 100 kcal/mol bond enthalpies, may make recycling polyolefin plastics relatively challenging. Accordingly, pyrolysis at high temperatures of about 500° C. to 1000° C. is generally used to break down polyolefins during recycling processes. However, the pyrolysis process is usually energy intensive, as a large amount of heat is required to break down the polyolefins. On the other hand, the presently described methods may allow for the dehydrogenation of carbon atoms in the polymer backbone to produce carbon-carbon double bonds under mild conditions, such as temperatures of less than 100° C. in one or more embodiments. These carbon-carbon double bonds are generally more reactive than carbon-carbon single bonds. Accordingly, the inclusion of a carbon-carbon double bond in the backbone of the polymer may allow the olefin-containing hydrocarbon product to be further processed by methods that are not typically used during processes for recycling polyolefins, such as metathesis reactions.

In one or more embodiments, the mechanical agitation of the reaction mixture may result in a product with reduced molecular weight relative to the solid polyolefins. According to embodiments, the solid polyolefins have an average molecular weight and the olefin-containing hydrocarbon polymers may have an average molecular weight. In some embodiments, the average molecular weight of the solid polyolefins is greater than the average molecular weight of the olefin-containing hydrocarbon polymers. In some embodiments, the average molecular weight of the olefin-containing hydrocarbon polymers may be at least 25% less than the average molecular weight of the solid polyolefins, such as at least 35% less, at least 45% less, at least 55% less, or even at least 65% less than the average molecular weight of the solid polyolefins. Without intending to be bound by theory, the mechanical agitation used to contact the solid polyolefins with the catalyst may be operable to break carbon-carbon bonds in the backbone of the reactant polymers. Accordingly, the olefin-containing hydrocarbon product polymers may generally have a shorter chain length than the solid polyolefin polymers. Reducing the average molecular weight of the solid polyolefin reactants may make further processing or recycling of plastic articles easier.

In one or more embodiments, following the mechanical agitation step, the olefin-containing hydrocarbon polymers may be separated from the solid catalyst. Separating the olefin containing hydrocarbon polymers from the solid catalyst may be achieved by any suitable means. For example, separating the olefin-containing hydrocarbon polymers from the catalyst may comprise extracting the olefin-containing hydrocarbon polymers using a non-polar solvent. The non-polar solvent may comprise, without limitation, hexane, toluene, or combinations thereof. Without intending to be bound by theory, separation of the olefin-containing hydrocarbon polymers from the solid catalyst may allow the solid catalyst to be reused.

EXAMPLES

The various aspects of the present disclosure will be further clarified by the following examples. The examples are illustrative in nature and should not be understood to limit the subject matter of the present disclosure.

Example 1—Milling Polyethylene in the Presence of Zeolite Catalysts

Polyethylene was milled in the presence of zeolite catalysts to form olefin-containing hydrocarbon polymers. 1.4 grams of polyethylene was added to each of four grinding jars to create four samples, as shown in Table 1. The molecular weight of the polyethylene was about 4000 Da. Then, 18.6 g of zeolite catalyst was added to each of the grinding jars. Specifically, USY zeolite catalyst, CBV760 from Zeolyst International, was added to samples 1 and 2, and HZSM-5 zeolite catalyst, HSZ-822HOA from Tosoh, was added samples 3 and 4. Then, 25 mL of 5 mm stainless steel grinding balls was added to each of the jars. Samples 1 and 3 were milled for one hour at 1-400 rpm. Samples 2 and 4 were milled for 12 hours at 1-400 rpm. After milling each of the samples, the products were separated from the zeolite catalyst and grinding balls by extraction with hexane. For each sample, the contents of the grinding jar was transferred into a 125 mL flask. Then, 50 mL of hexane was added to the flask, and the flask was sonicated for 30 minutes. The grinding balls were removed from the slurry using a sieve. Then, the slurry was centrifuged at 10,000 rpm for 5 minutes to separate the solid catalyst from the organic phase. The hexane was separated from the product by rotary evaporation, and the product was dried under vacuum. The product recovered from each of the samples was a waxy residue having a clear to pale yellow color.

TABLE 1

| Sample No. | Polyethylene Mass (g) | Catalyst Type | Catalyst Mass (g) | Milling Time (hr) |
| --- | --- | --- | --- | --- |
| 1 | 1.4 | USY zeolite | 18.6 | 1 |
| 2 | 1.4 | USY zeolite | 18.6 | 12 |

TABLE 1-continued

| Sample No. | Polyethylene Mass (g) | Catalyst Type | Catalyst Mass (g) | Milling Time (hr) |
| --- | --- | --- | --- | --- |
| 3 | 1.4 | ZSM-5 zeolite | 18.6 | 1 |
| 4 | 1.4 | ZSM-5 zeolite | 18.6 | 12 |

Product from each sample was analyzed by gel permeation chromatography (GPC), a type of size exclusion chromatography. Generally in GPC, a sample is dissolved in a solvent and passed through a bed of porous beads. Smaller compounds may be trapped within the pore network of the beads such that larger compounds elute from the bed before smaller compounds.

Figure 1:
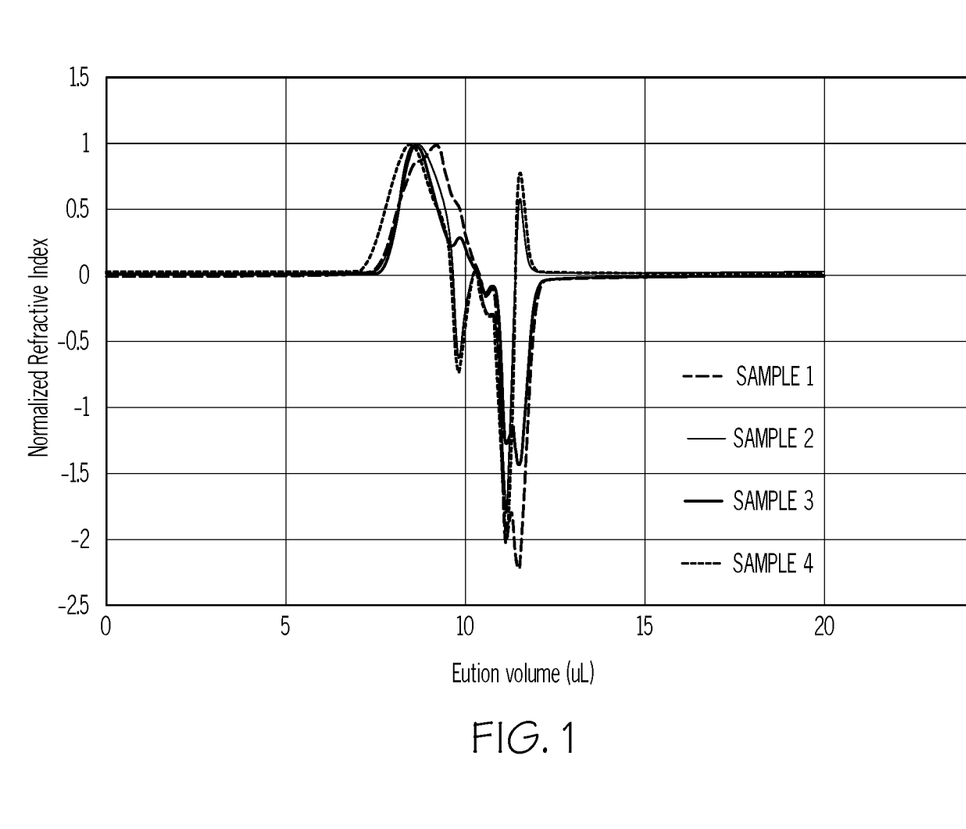
FIG. 1 depicts gel permeation chromatography curves according to Example 1 of the present application.

Each sample was analyzed by GPC. Product from each of samples 1-4 was dissolved in tetrahydrofuran (THF) and passed through a GPC column. FIG. 1 depicts the normalized refractive index of each sample over the elution volume of each sample. Table 2 includes the retention volume and molecular weight information for each sample. A reference curve for the polyethylene starting material was not obtained, as the polyethylene sample would not dissolve in the THF solvent. However, the starting polyethylene had a molecular weight of 4000 Da. Accordingly, Table 2 shows that the molecular weight reduction was from about 3000 Da to about 1000 Da.

TABLE 2

| Sample No. | Retention Volume (ml) | Molecular Weight (Da) |
| --- | --- | --- |
| 1 | 9.21 | 1043 |
| 2 | 8.69 | 2339 |
| 3 | 8.622 | 2574 |
| 4 | 8.476 | 3151 |

Thermogravimetric analysis (TGA) was performed on the product obtained from milling each of the polyethylene samples. Generally, TGA is a characterization technique where the mass of a sample is recorded as the sample is subjected to heat. TGA cures show the degradation of a sample due to temperature, with more volatile compounds being vaporized before more stable compounds. Generally, TGA curves show percent mass lost on the y axis and temperature on the x axis.

Figure 2:
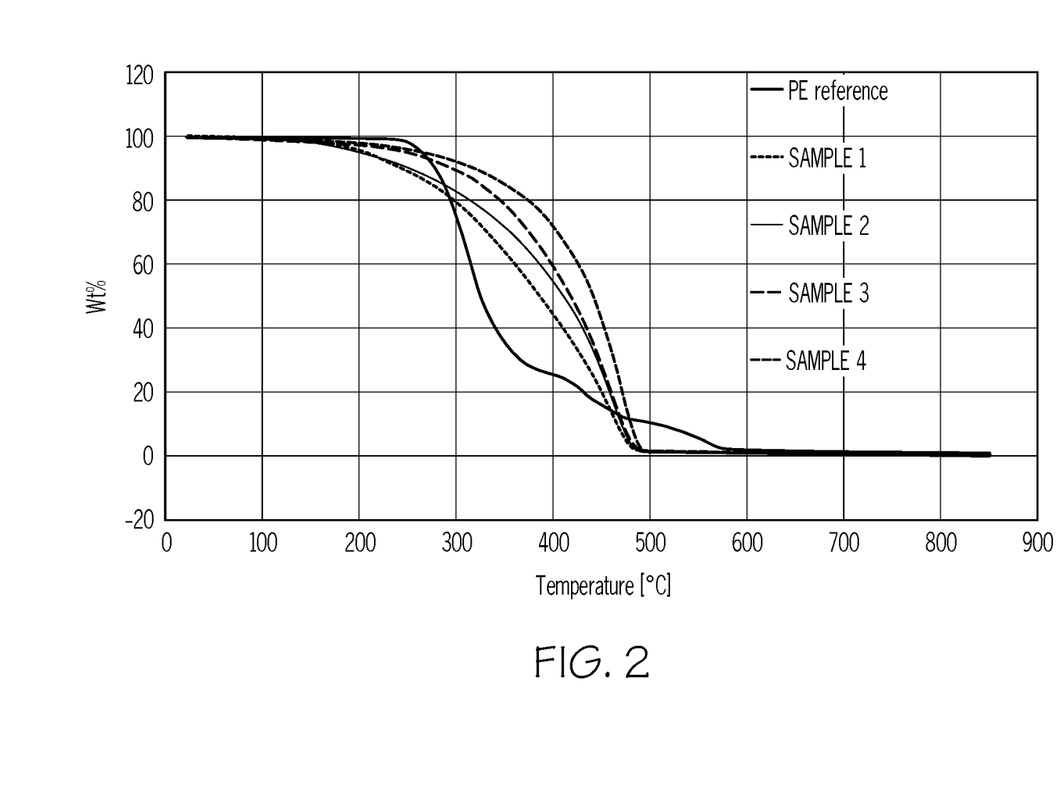
FIG. 2 depicts thermogravimetric analysis curves according to Example 1 of the present application.

For each sample, product was loaded onto a microbalance and then lowered into a furnace, to allow the change in mass of the sample to be recorded as the temperature of the furnace changed. The TGA curves for product from each of the samples are shown in FIG. 2. FIG. 2 also includes a reference curve for polyethylene that was not milled or contacted with a zeolite in a mill. As shown in FIG. 2, product from each sample experienced degradation onset and completion before the reference curve. This is likely due to the reduction in molecular weight of the samples. The TGA curves for each sample extend past the reference curve between the onset and completion points. This is likely due to cross-linking of the product of each sample.

Nuclear magnetic resonance (NMR) spectroscopy was performed on product from each of the samples. Generally, NMR spectroscopy is an analytical technique that involves using a magnetic field to determine the chemical structure of the material being analyzed.

Both $^1$H and $^{13}$C NMR spectra were taken of the product obtained from milling each sample. Heteronuclear single quantum coherence (HSQC) spectroscopy was used when signals were detected in the regions that indicate the presence of olefins. HSQC is a two dimensional NMR spectroscopy technique that allows for the correlation of two spectra from the same sample. Cross peaks are detected where peaks in each spectra overlap, allow for the confirmation of signals in each of the spectra. Generally, peaks at about 5 to 6 ppm in $^1$H NMR spectray and at about 100 to 150 ppm in $^{13}$C NMR spectra indicate the presence of olefins.

Figure 3:
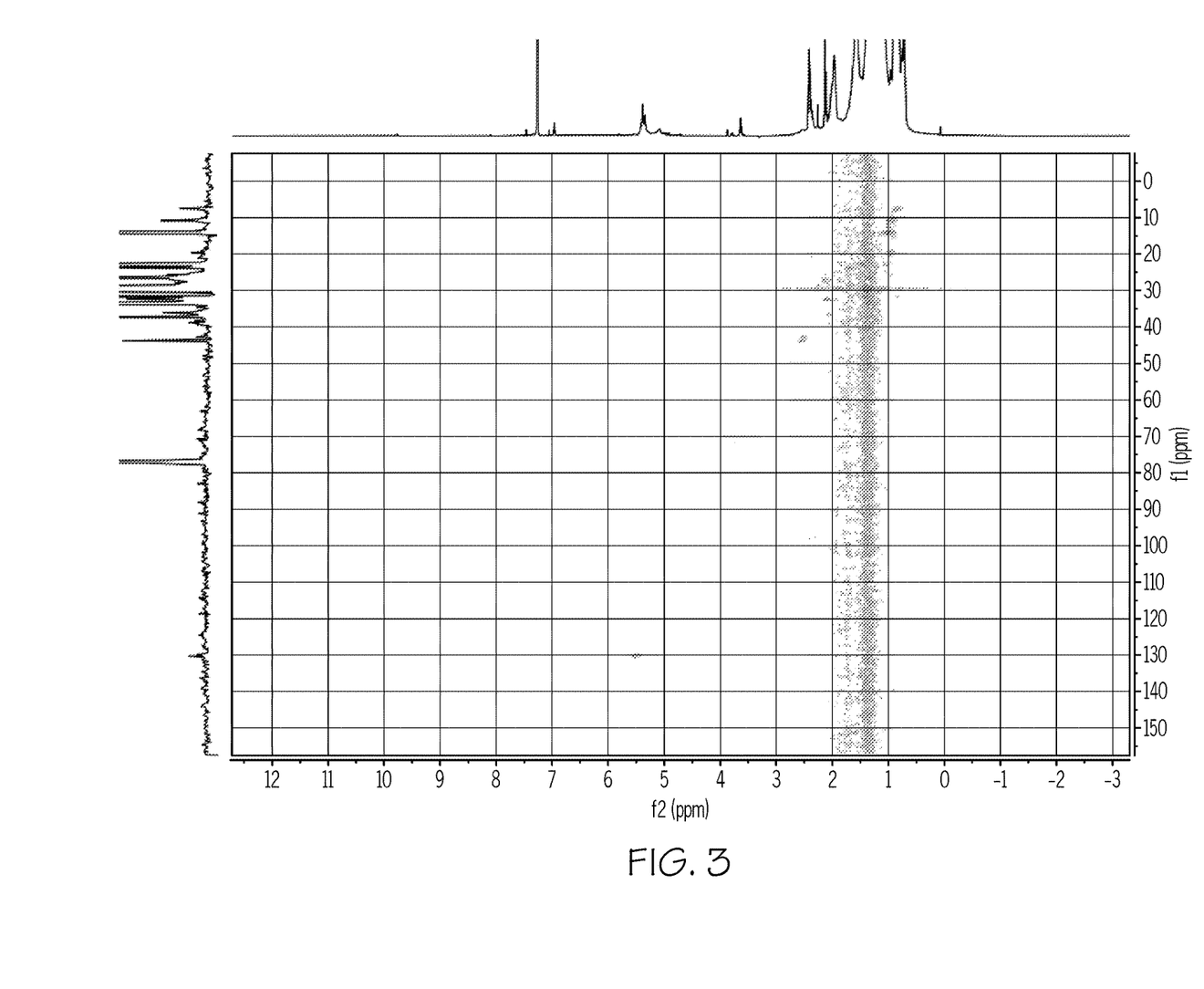
FIG. 3 depicts a heteronuclear single quantum coherence spectrum according to Example 1 of the present application.

FIG. 3 depicts a HSQC spectrum that correlates the $^1$H NMR and $^{13}$C NMR spectra for Sample 4. The presence of olefins in the sample is confirmed by the cross peak at 130 ppm, 5.5 ppm of the HSQC spectrum.

Figure 4:
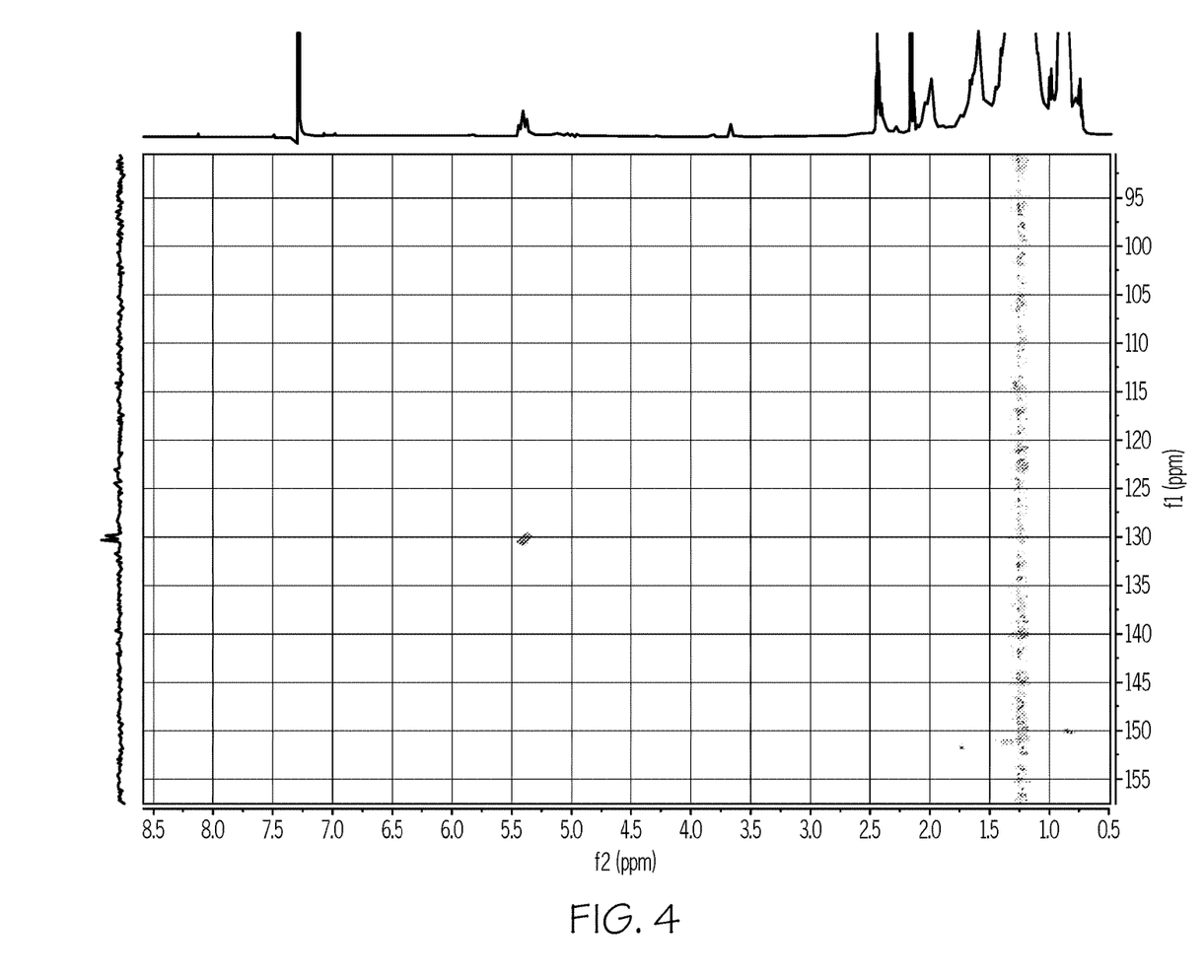
FIG. 4 depicts a heteronuclear single quantum coherence spectrum according to Example 1 of the present application.

FIG. 4 depicts a HSQC spectrum that correlates the $^1$H NMR and $^{13}$C NMR spectra for Sample 2. The presence of olefins in the sample is confirmed by the cross peak at 130 ppm, 5.5 ppm of the HSQC spectrum.

Figure 5:
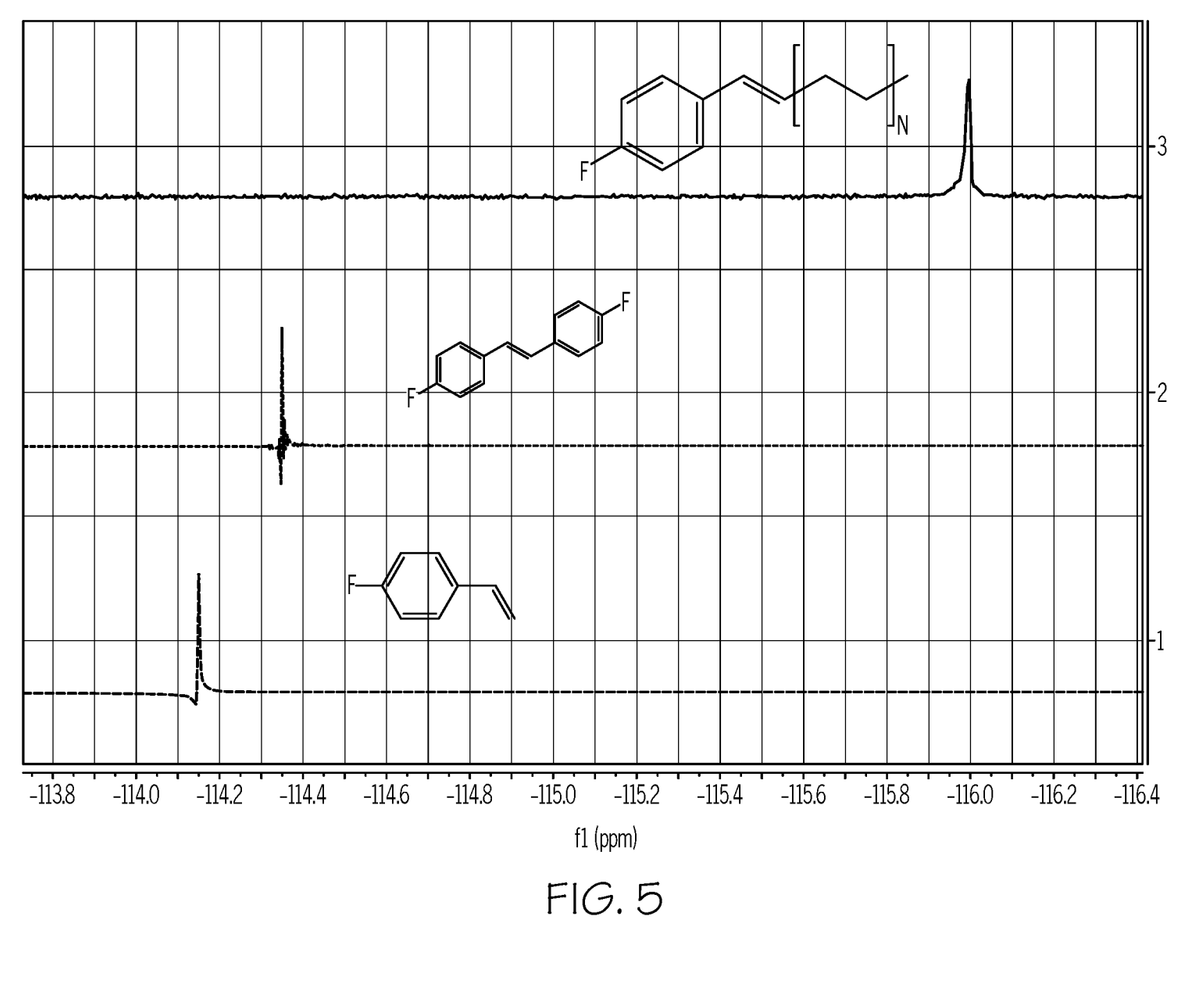
FIG. 5 depicts $^{19}F$ nuclear magnetic resonance spectra according to Example 1 of the present application.

To confirm the presence of olefins within the product of the Sample 2, an olefin metathesis reaction was carried out using a Grubbs II catalyst and 4-fluorostyrene, according to Reaction Scheme (I):

Generally, olefin metathesis is a redistribution of olefins via scission and regeneration of carbon-carbon double bonds. The olefin metathesis reaction of Reaction Scheme (I) allowed the olefin in the product to be functionalized with an R-group containing fluorine to produce a cross-metathesis product. This allows the presence of the carbon-carbon double bond in the milling product to be verified by fluorine NMR spectroscopy. Additionally, a control experiment was conducted using Grubbs II and 4-fluorostyrene to produce a 4,4-fluorostillbene self-metathesis product. The reaction products were analyzed by $^{19}$F NMR spectroscopy, and the $^{19}$F NMR spectra are shown in FIG. 5. FIG. 5 includes three $^{19}$F NMR spectra, showing the peaks for the fluorine functionalized product (Spectrum 3), 4-fluorostyrene (Spectrum 2), and 4,4-fluorostillbene (Spectrum 1). This indicates that the milling product of the sample includes a carbon-carbon double bond in the polymer backbone.

Example 2—Comparative Example

Figure 6:
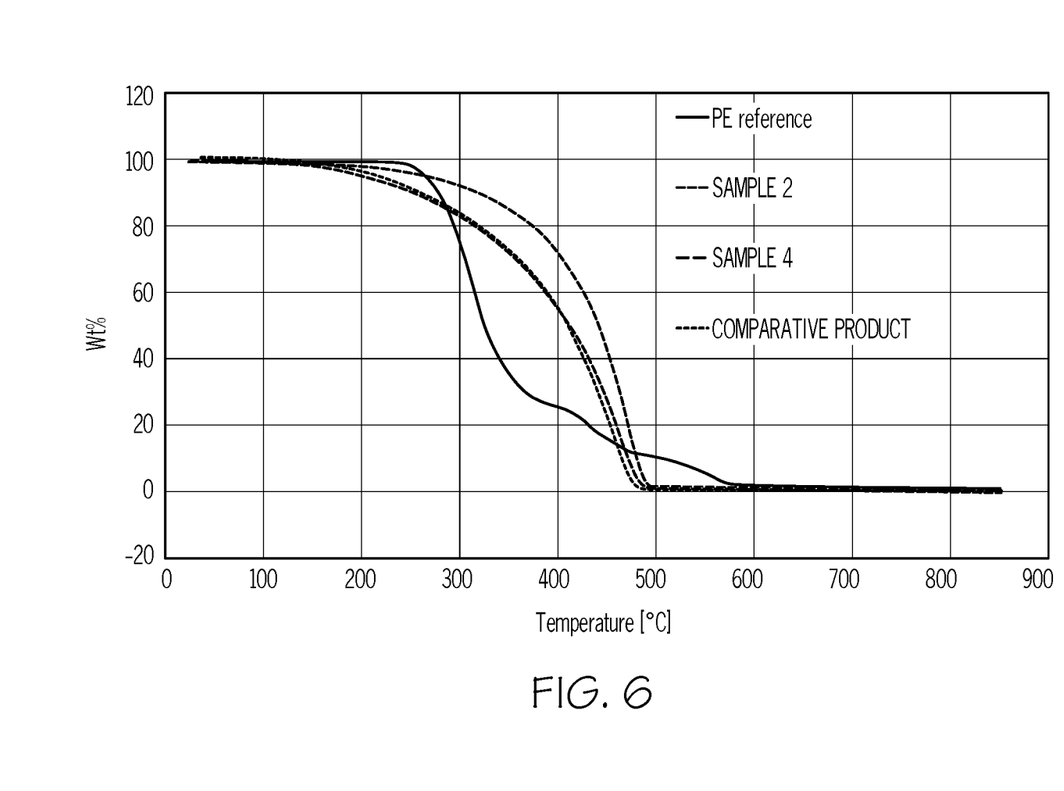
FIG. 6 depicts thermogravimetric analysis curves according to Example 2 of the present application.

As a comparative sample, polyethylene was milled without contacting the polyethylene with zeolite catalysts to form a comparative product. The polyethylene was milled for 12 hours at 400 rpm in a planetary ball mill to form the comparative product. The comparative product was a clear residue that had a reduced molecular weight. The comparative product was analyzed by TGA and the TGA curve for the comparative product and the product of samples 2 and 4 is shown in FIG. 6. As shown in FIG. 6, the difference in degradation between the comparative product and the product of samples 2 and 4 was minimal.

Figure 7:
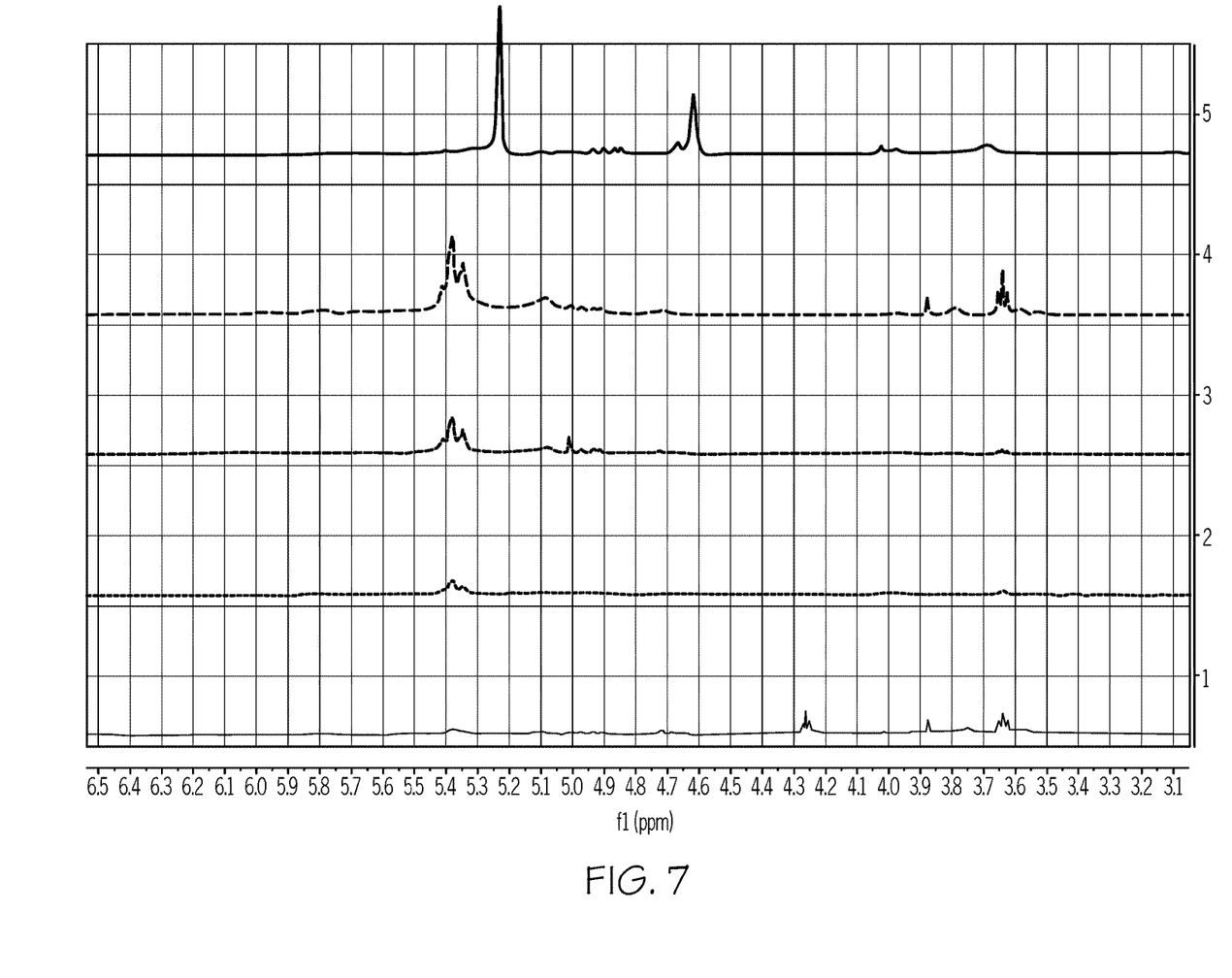
FIG. 7 depicts $^{1}H$ nuclear magnetic resonance spectra according to Example 2 of the present application.

The comparative product was also analyzed by $^1$H NMR spectroscopy. The $^1$H NMR spectrum of the comparative product is shown in FIG. 7. FIG. 7 includes 5 $^1$H NMR spectra, Spectrum 1 to Spectrum 5. Spectrum 1 is a $^1$H NMR of the product of Sample 3. Spectrum 2 is a $^1$H NMR of a product formed by milling polyethylene with the ZSM-5 zeolite for three hours. Spectrum 3 is a $^1$H NMR of a product formed by milling polyethylene with the ZSM-5 zeolite for six hours. Spectrum 4 is a $^1$H NMR of the product of Sample 4. Spectrum 5 is a $^1$H NMR of the comparative product. Spectrum 5, the $^1$H NMR spectrum of the comparative product, does not include a peak at about 5.4 ppm to indicate the presence of an olefin, carbon-carbon double bond, in the backbone of the polymer. On the other hand, Spectra 1-4 each included a peak at 5.4 ppm to indicate the presence of an olefin in backbone of the polymer in those samples.

According to a first aspect of the present disclosure, a method for processing polyolefins may include contacting solid polyolefins with a solid catalyst to form a reaction mixture. The solid catalyst may be chosen from a zeolite, a microporous aluminosilicate, an alumina, or combinations thereof. The solid polyolefins may be chosen from polyethylene, polypropylene, or combinations thereof. The method may include mechanically agitating the reaction mixture to produce olefin-containing hydrocarbon polymers and separating the olefin-containing hydrocarbon polymers from the solid catalyst. The olefin-containing hydrocarbon polymers include a carbon-carbon double bond in the backbone of the hydrocarbon polymers.

A second aspect of the present disclosure may include the first aspect, wherein the solid polyolefins comprise polyethylene.

A third aspect of the present disclosure may include either the first aspect or the second aspect, wherein the solid polyolefins comprise polypropylene.

A fourth aspect of the present disclosure may include any of the first through third aspects, wherein mechanically agitating comprises milling.

A fifth aspect of the present disclosure may include any of the first through fourth aspects, wherein mechanically agitating comprises extruding.

A sixth aspect of the present disclosure may include any of the first through fifth aspects, wherein the reaction mixture consists essentially of solids.

A seventh aspect of the present disclosure may include any of the first through sixth aspects, wherein a mass ratio of the solid polyolefins to the catalyst is from 1:100 to 15:100.

An eighth aspect of the present disclosure may include any of the first through seventh aspects, wherein mechanically agitating the reaction mixture occurs for a period of time from 1 hour to 12 hours.

A ninth aspect of the present disclosure may include any of the first through eighth aspects, wherein mechanically agitating the reaction mixture occurs at a temperature of less than or equal to 100° C.

A tenth aspect of the present disclosure may include any of the first through ninth aspects, wherein contacting the solid polyolefins and the catalyst occurs at a temperature less than a melting point of the solid polyolefins.

An eleventh aspect of the present disclosure may include any of the first through tenth aspects, wherein the mechanical agitation device is a ball mill or a twin screw extruder.

A twelfth aspect of the present disclosure may include any of the first through eleventh aspects, wherein the solid catalyst comprises the zeolite.

A thirteenth aspect of the present disclosure may include the twelfth aspect, wherein the zeolite is a USY zeolite, a HZSM-5 zeolite, a CHA zeolite, or combinations thereof.

A fourteenth aspect of the present disclosure may include any of the first through thirteenth aspects, wherein the solid catalyst comprises the microporous aluminosilicate.

A fifteenth aspect of the present disclosure may include the fourteenth aspect, wherein the microporous aluminosilicate has a silica to alumina ratio from 20 to 30.

A sixteenth aspect of the present disclosure may include any of the first through fifteenth aspects, wherein the solid catalyst comprises the alumina.

A seventeenth aspect of the present disclosure may include any of the first through sixteenth aspects, wherein separating the olefin-containing hydrocarbon polymers from the catalyst comprises extracting the olefin-containing hydrocarbon polymers using a non-polar solvent.

An eighteenth aspect of the present disclosure may include the seventeenth aspect, wherein the non-polar solvent comprises hexane, toluene, or combinations thereof.

A nineteenth aspect of the present disclosure may include any of the first through eighteenth aspects, wherein the solid polyolefins have an average molecular weight and the olefin-containing hydrocarbon polymers have an average molecular weight and the average molecular weight of the solid polyolefins is greater than the average molecular weight of the olefin-containing hydrocarbon polymers.

A twentieth aspect of the present disclosure may include any of the first through nineteenth aspects, wherein the solid polyolefins have an average molecular weight and the olefin-containing hydrocarbon polymers have an average molecular weight and the average molecular weight of the olefin-containing hydrocarbon polymers is at least 25% less than the average molecular weight of the solid polyolefins.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

Additionally, the term "consisting essentially of" is used in this disclosure to refer to quantitative values that do not materially affect the basic and novel characteristic(s) of the disclosure. For example, a chemical composition "consisting essentially" of a particular chemical constituent or group of chemical constituents should be understood to mean that the composition includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition should be appreciated as containing, in some embodiments, a mixture of isomers of that constituent. In additional embodiments, the chemical compounds may be present in alternative forms such as derivatives, salts, hydroxides, etc.

The invention claimed is:

1. A method for processing polyolefins, the method comprising:
   contacting solid polyolefins with a solid catalyst to form a reaction mixture, wherein the solid catalyst is chosen from a zeolite, a microporous aluminosilicate, an alumina, or combinations thereof, and wherein the solid polyolefins are chosen from polyethylene, polypropylene, or combinations thereof;
   mechanically agitating the reaction mixture to produce olefin-containing hydrocarbon polymers, wherein the olefin-containing hydrocarbon polymers comprise a carbon-carbon double bond in the backbone of the hydrocarbon polymers; and
   separating the olefin-containing hydrocarbon polymers from the solid catalyst.

2. The method of claim 1, wherein the solid polyolefins comprise polyethylene.

3. The method of claim 1, wherein the solid polyolefins comprise polypropylene.

4. The method of claim 1, wherein mechanically agitating comprises milling.

5. The method of claim 1, wherein mechanically agitating comprises extruding.

6. The method of claim 1, wherein the reaction mixture consists essentially of solids.

7. The method of claim 1, wherein a mass ratio of the solid polyolefins to the catalyst is from 1:100 to 15:100.

8. The method of claim 1, wherein mechanically agitating the reaction mixture occurs for a period of time from 1 hour to 12 hours.

9. The method of claim 1, wherein mechanically agitating the reaction mixture occurs at a temperature of less than or equal to 100° C.

10. The method of claim 1, wherein contacting the solid polyolefins and the catalyst occurs at a temperature less than a melting point of the solid polyolefins.

11. The method of claim 1, wherein mechanically agitating the reaction mixture occurs in a mechanical agitation device and the mechanical agitation device is a ball mill or a twin screw extruder.

12. The method of claim 1, wherein the solid catalyst comprises the zeolite.

13. The method of claim 12, wherein the zeolite is a USY zeolite, a HZSM-5 zeolite, a CHA zeolite, or combinations thereof.

14. The method of claim 1, wherein the solid catalyst comprises the microporous aluminosilicate.

15. The method of claim 14, wherein the microporous aluminosilicate has a silica to alumina ratio from 20 to 30.

16. The method of claim 1, wherein the solid catalyst comprises the alumina.

17. The method of claim 1, wherein separating the olefin-containing hydrocarbon polymers from the catalyst comprises extracting the olefin-containing hydrocarbon polymers using a non-polar solvent.

18. The method of claim 17, wherein the non-polar solvent comprises hexane, toluene, or combinations thereof.

19. The method of claim 1, wherein the solid polyolefins have an average molecular weight and the olefin-containing hydrocarbon polymers have an average molecular weight and the average molecular weight of the solid polyolefins is greater than the average molecular weight of the olefin-containing hydrocarbon polymers.

20. The method of claim 1, wherein the solid polyolefins have an average molecular weight and the olefin-containing hydrocarbon polymers have an average molecular weight and the average molecular weight of the olefin-containing hydrocarbon polymers is at least 25% less than the average molecular weight of the solid polyolefins.

* * * * *